United States Patent [19]

Solini

[11] Patent Number: 4,967,179

[45] Date of Patent: Oct. 30, 1990

[54] SADDLE FOR CYCLES, MOTOR CYCLES AND THE LIKE

[75] Inventor: Fabio Solini, Cassola, Italy

[73] Assignee: Selle San Marco Di Girardi Comm. Luigi S.p.A., Vicenza, Italy

[21] Appl. No.: 334,657

[22] Filed: Apr. 7, 1989

[30] Foreign Application Priority Data

Apr. 14, 1988 [IT] Italy .............................. 673248 A/88

[51] Int. Cl.⁵ .............................................. B62J 6/00
[52] U.S. Cl. .................................... 340/432; 340/479; 362/72; 362/75
[58] Field of Search ...................... 340/432, 479, 467; 362/72, 75; 200/61.12, 61.87; D6/354

[56] References Cited

U.S. PATENT DOCUMENTS

D. 125,923 3/1941 Mueller ........................... 340/432 X
4,031,343 6/1977 Sopko ............................. 340/432 X
4,792,882 12/1988 Guevremont ................... 340/432 X
4,833,444 5/1989 Wisniewski .................. 200/66.12 X

FOREIGN PATENT DOCUMENTS 3117189 11/1982 Fed. Rep. of Germany ...... 340/432
969900 12/1950 France ................................ 340/432
2306120 10/1976 France ................................ 340/432
0223532 12/1984 Japan .................................. 340/432

Primary Examiner—Joseph A. Orsino
Assistant Examiner—Brian R. Tumm
Attorney, Agent, or Firm—Sughrue, Mion, Zinn, Macpeak & Seas

[57] ABSTRACT

A saddle for cycles, motor cycles and the like, includes a light in the rear part of the saddle and a switch for detecting the braking of the vehicle and consequently switching on the light.

10 Claims, 1 Drawing Sheet

SADDLE FOR CYCLES, MOTOR CYCLES AND THE LIKE

BACKGROUND OF THE INVENTION

The present invention relates to a saddle for cycles, motor cycles and the like, characterised in that it includes a light in the rear part of the saddle and means for detecting the braking of the vehicle and consequently switching on the light.

SUMMARY OF THE INVENTION

The provision of a bicycle or a motor cycle with a saddle of this type achieves the object of increasing the safety of the rider since it gives any following vehicles a timely indication of the braking of the bicycle or motor cycle.

In one embodiment, the light comprises one or more indicator lamps facing transparent plates arranged in the rear surface of the saddle.

The lamps may conveniently be supplied from electrical accumulators which are recharged by solar cells.

In this embodiment two accumulators are preferably provided, each being connected to a lamp and being supplied by a solar cell, the elements being situated in a casing fitted to the lower part of the saddle.

The means for detecting the braking of the vehicle to advantage comprise an electrical switch which can be operated by at least one of the brakes of the vehicle.

BRIEF DESCRIPTION OF THE DRAWINGS

The present invention also relates to a bicycle provided with a seat of the type described above.

Further characteristics and advantages of the invention will become clear from a reading of the detailed description which follows with reference to the appended drawings, provided by way of non-limiting example, in which.

DETAILED DESCRIPTION OF THE INVENTION

Figure 2:
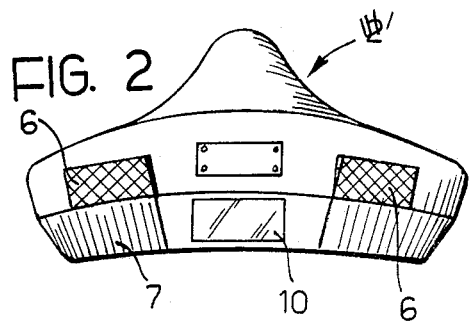
FIG. 2 is a view of the saddle from the rear, on an enlarged scale.
Figure 1:
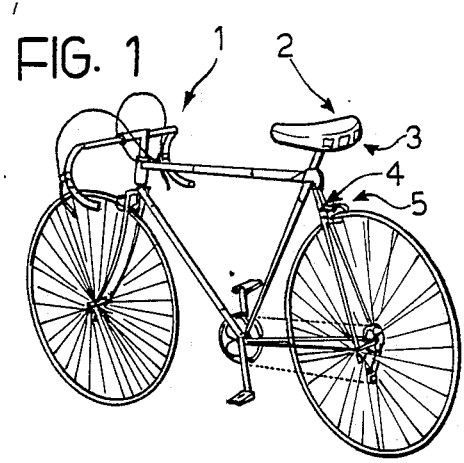
FIG. 1 shows schematically and in perspective, a bicycle provided with a device according to the present invention.
Figure 3:
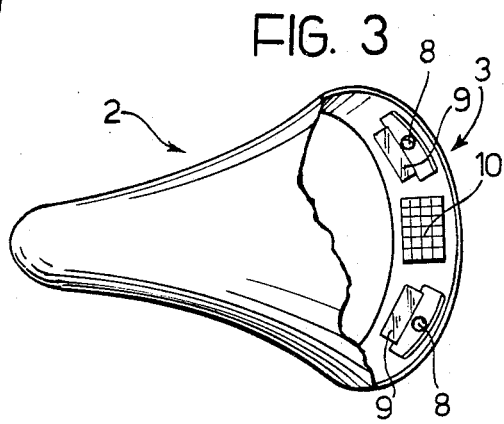
FIG. 3 is a partially-sectioned plan view of the saddle.
Figure 4:
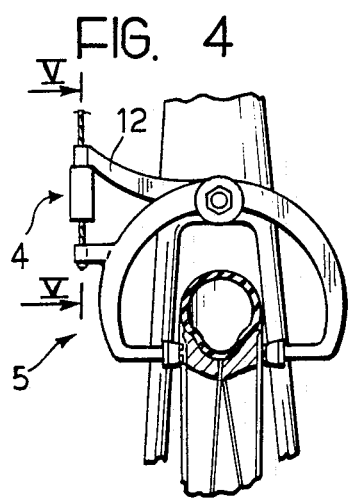
FIG. 4 is an elevational view of a brake of the bicycle on an enlarged scale.
Figure 5:
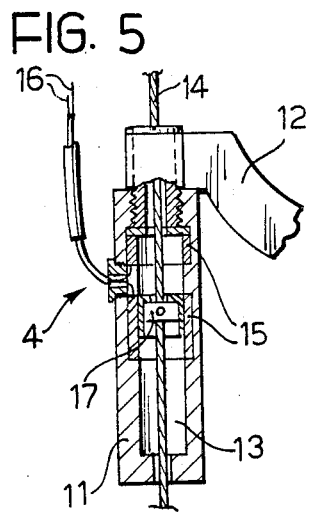
FIG. 5 is a section taken on the line V-V of FIG. 4, on an enlarged scale.

A bicycle is generally indicated 1 and is provided with a saddle 2 on the rear part of which is situated a light 3 which is switched on by the operation of a switch 4. The rear part of the saddle 2 has a pair of transparent plates 6. A casing 7 fitted to the under-side of the saddle carries a pair of indicator lamps which, after assembly of the casing, are situated facing the transparent plates 6. The casing also carries a pair of accumulators 9 which supply the indicator lamps 8. The accumulators 9 are recharged by a solar cell 10 carried by the casing and having one end projecting from the rear surface of the casing 7.

The circuit for supplying the indicator lamps 8 includes the switch 4 which is mounted, for example, on the rear Bowden cable operated brake 5 of the bicycle. The switch 4 includes a housing 11 fixed to a lever 12 for operating the brake 5. A cable 14 for operating the brake 5 passes through the space 13 within the housing 11. The housing 11, which is of insulating material, carries two cylindrical-shaped metal blades 15 facing the space 13. The blades 15 are connected to two electrical wires 16 and constitute the two terminals of the switch 4. A cylindrical body 17 having an outer surface of conductive material is slidable in the cavity 13 and is fixed to the cable 14 for operating the brake 5.

The operation of the brake 5 causes an upward movement of the cable 14 and of the body 17 establishing an electrical connection between the blades 15 and switching on the lamps 8.

Naturally, the principle of the invention remaining the same, the forms of embodiment and details of construction may be varied widely with respect to those described and illustrated, without thereby departing from scope of the present invention, as defined by the following claims.

What is claimed is:

1. A saddle assembly for a vehicle, said vehicle having a source of electrical power, wherein said assembly comprises:
   a saddle;
   a lamp means attached to the rear of said saddle;
   detection means for detecting braking of the vehicle, and
   connection means responsive to said detection means for connecting said source to said lamp means whilst the vehicle is braking;
   wherein said saddle further comprises at least one transparent plate mounted in the rear surface thereof and said lamp means comprises at least one indicator lamp mounted behind said at least one plate.

2. An assembly according to claim 1 wherein said saddle further includes solar cell means for charging said source.

3. An assembly according to claim 2, and further including casing means for housing said source of electrical power.

4. An assembly according to claim 3, wherein said source comprises two accumulators lamp means includes a second indicator lamp, and each of the indicator lamps is connected to a respective one of the accumulators.

5. A bicycle having a source of electrical power and a saddle assembly comprising
   a saddle;
   a lamp means attached to the rear of said saddle;
   detection means for detecting braking of said bicycle, and
   connection means responsive to said detection means for connecting said source to said lamp means whilst said bicycle is braking,
   wherein said saddle further comprises at least one transparent plate mounted in the rear surface thereof and said lamp means comprises at least one indicator lamp mounted behind said at least one plate.

6. A bicycle according to claim 5, wherein said detection means comprises a switch responsive to operation of a brake of the bicycle.

7. A bicycle according to claim 6, wherein said brake is a Bowden cable operated brake and said switch comprises a first member attached to the inner cable of said Bowden cable and a second member forming part of the outer cable of said Bowden cable, said second member having two spaced, inwardly directed, electrically conductive blades forming part of an electrical circuit and said first member being electrically conductive and movable into contact with said blades upon operation of the brake.

8. A bicycle according to claim 5, wherein said saddle further includes solar cell means for charging said source.

9. A bicycle according to claim 8, and further including casing means for housing said source of electrical power.

10. A bicycle according to claim 9, wherein said source comprises two accumulators and said lamp means includes a second indicator lamp, and each of the indicator lamps is connected to a respective one of the accumulators.

* * * * *